Feb. 13, 1951 C. E. LINCOLN Re. 23,340
AUTOMATIC ENGINE-WARMING MECHANISM
Original Filed Oct. 23, 1948
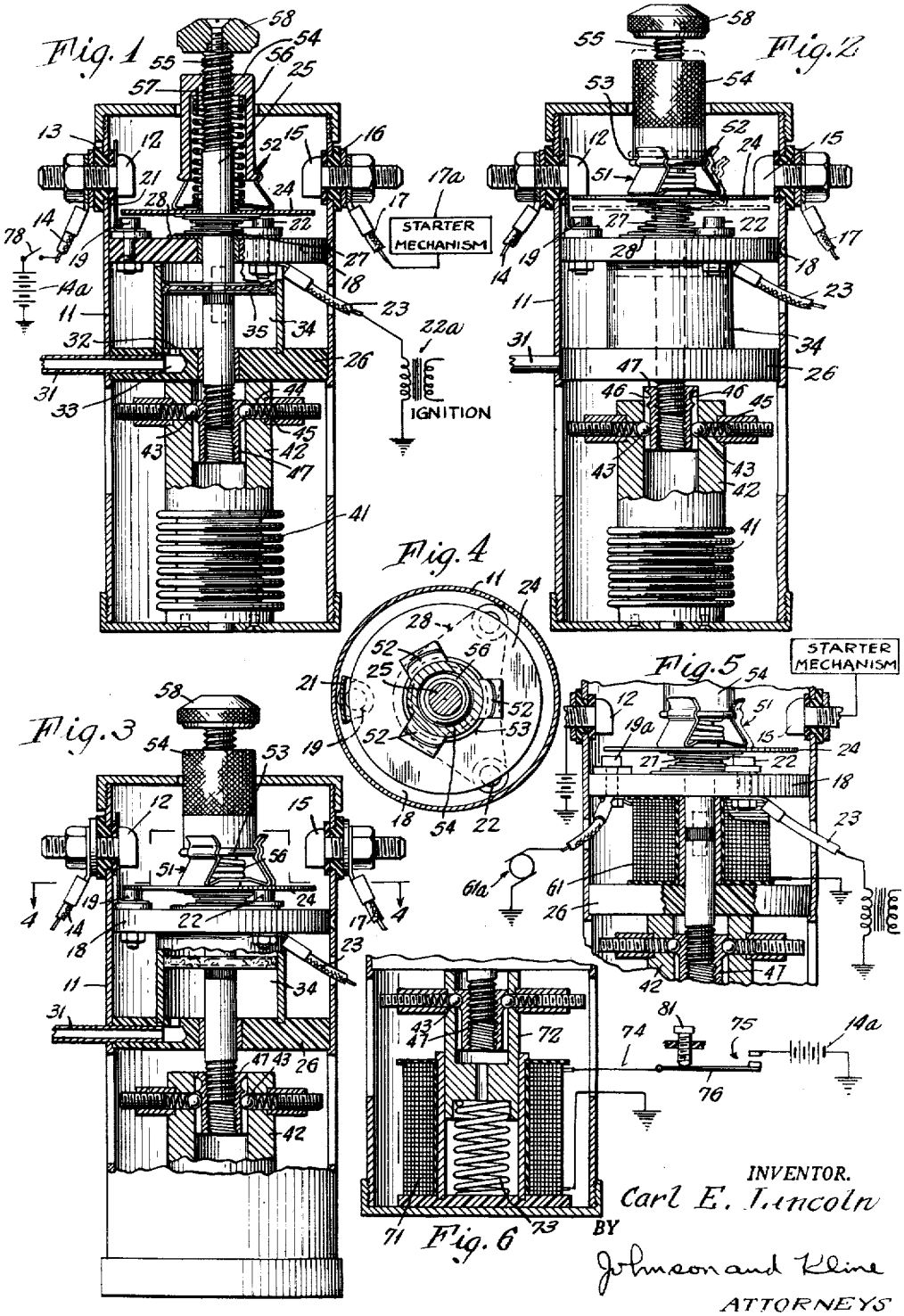
INVENTOR.
Carl E. Lincoln
BY
Johnson and Kline
ATTORNEYS Reissued Feb. 13, 1951

Re. 23,340

UNITED STATES PATENT OFFICE 23,340

AUTOMATIC ENGINE-WARMING MECHANISM

Carl E. Lincoln, White River Junction, Vt.

Original No. 2,497,948, dated February 21, 1950, Serial No. 56,150, October 23, 1948. Application for reissue November 7, 1950, Serial No. 194,549

25 Claims. (Cl. 290—2)

Matter enclosed in heavy brackets [ ] appears in the original patent but forms no part of this reissue specification; matter printed in italics indicates the additions made by reissue

This invention relates to internal combustion engines, and an object is to provide an improved mechanism for maintaining the engine temperature above a predetermined minimum during normally idle periods whereby the engine is protected against freezing, ease of starting is maintained and other advantages gained.

A feature of the invention is the provision of a simple, dependable and inexpensive device for accomplishing the desired result, constructed and arranged to operate with conventional internal combustion engine systems without requiring any alterations therein other than the application of the present invention thereto.

A further feature is the provision of an improved arrangement of temperature responsive switch mechanism for controlling the ignition and starter circuits independently of the usual manual switch whereby during normally idle periods the engine will be automatically started when the engine temperature reaches a predetermined minimum, and operation of the engine maintained until the temperature rises to a desired maximum, whereupon the ignition circuit is automatically broken and the operation terminated, the cycle being automatically repeated whenever conditions require.

A further feature of the invention is the provision in such a mechanism of a device arranged to prevent its operation if the engine fails to start after a predetermined period of cranking by the starter motor, in order to prevent draining of the battery. Also, when the device is installed on an automotive vehicle a safety feature is included for preventing the device from operating under improper conditions, for example, when the transmission is in gear, or the like.

These and other objects and features are attained by the present invention, one specific embodiment of which is hereinafter described for the purposes of disclosure.

In the accompanying drawings:

Figure 1 is a transverse sectional view through a temperature responsive circuit controlling mechanism constructed in accordance with one embodiment of the invention, the parts being shown in neutral or inoperative position.

Fig. 2 is a similar view showing in full lines the parts in the position occupied during operation of the engine starter motor.

Fig. 3 is a similar view showing the position of the parts during running of the engine.

Fig. 4 is a transverse sectional view on the line 4—4 of Fig. 3.

Figs. 5 and 6 are partial sections similar to

Figs. 1, 2 and 3, illustrating further modifications.

One purpose of the present invention is to provide a device which can be easily installed either as original equipment or in existing systems for controlling the ignition and starter motor circuits of an internal combustion engine during normally idle periods for the purpose of preventing the engine temperature from falling below a predetermined minimum, by automatically starting the engine, and maintaining it in operation until its temperature reaches a desired maximum, whereupon operation is terminated until the temperature again falls to the minimum selected, whereupon the cycle of operations is repeated.

The device is arranged to operate entirely independently of the usual manual ignition switch, such for example, as the lock switch on a motor car, and can be located so that the temperature responsive control is caused to function by temperature variations of the engine block, the cooling fluid, the lubricating oil, the exhaust pipe or any other device which forms a gauge of the engine temperature.

The particular embodiment of the invention which is shown in the drawings comprises a metallic casing 11 having a terminal 12 supported thereon and connected through an insulating bushing 13 to a line 14 leading to a source of potential such, for example, as the storage battery 14a of a motor car. A similar terminal 15 is connected through an insulating bushing 16 with a line 17 leading to a starting motor 17a of conventional arrangement. In a motor car system, for example, the connections described constitute a shunt circuit around the usual manually operated starter switch mechanism not shown. An insulating disk 18 is secured on the casing 11 below the battery and motor terminals. A second battery terminal 19 is mounted on the disk 18 and in the embodiment shown in Figs. 1 to 3, is connected by a contact strip 21 to the battery terminal 12, or it may be connected directly to the battery circuit. An ignition circuit terminal 22 is also secured on the disk 18 and is connected to the ignition circuit 22a by connecting line 23.

As illustrated, the mechanism for controlling the various circuits comprises a switch mechanism including a contact plate 24 mounted on a centrally disposed vertically movable current conducting rod 25 extending slidably through the insulating disk 18 and a similar insulating disk 26 spaced below the disk 18. The rod and contact plate are movable to locate the plate in starting position as shown in Fig. 2 to close both the ignition and starter circuits, into operating position as shown in Fig. 3 to open the starter circuit and close the ignition circuit only, and into neutral position as shown in Fig. 1 in which all circuits are open. A coil spring 27 is compressed between the contact plate 24 and the insulating disk 18 to normally press the contact plate upwardly into the first or starting position closing both starter and ignition circuits. The spring bears upon and is electrically connected to a current conducting spider 28 through which the ignition terminal 22 extends and to which it is electrically connected.

The mechanism includes a device for moving the rod 25 and contact plate 24 from the starting position into the operating position to disconnect the starter circuit and close the ignition circuit only when the associated engine is in operation. As illustrated in Figs. 1 to 3, this mechanism includes a vacuum device connected through a line 31 with the engine manifold and comprising a port opening 32 in the insulating disk 26 communicating with the line 31 thereof to passage 33 in the disk so as to connect the line 31 with a vacuum cylinder 34 surrounding the rod 25 and supported on the disk 26. A piston 35 is secured to the rod 25 within the cylinder so that upon operation of the engine the pressure within the cylinder being reduced, the piston will be drawn downwardly to lower the rod 25 and move the contact plate 24 into operating position shown in Fig. 3, thus breaking the starter circuit while maintaining the ignition circuit closed.

The normal operation of the rod 25 and contact plate 24 is made responsive to temperature conditions by a thermostatic element which is automatically connected to the rod 25 to hold the contact plate 24 in neutral position when the engine is within a predetermined range. However, at a selected minimum temperature the thermostatic mechanism automatically disconnects itself from the rod 25 and plate 24 to permit movement of the contact plate under impulse of the spring 27 into the starting position shown in Fig. 2, thereby closing both the starter and ignition circuits and starting the associated engine. As illustrated in Figs. 1 to 3, the thermostat is in the form of a bellows 41 mounted in the bottom of the casing 11 and including a vertically extending cylinder 42 which is moved vertically by expansion and contraction of the bellows 41. Yieldable means for connecting and disconnecting the cylinder 42 to the rod 25 consists, in the form illustrated, of an adjustable detent connection comprising detent balls 43 mounted in radial bores 44 in the cylinder 42 and yieldingly pressed by adjustable spring means 45 to seat in detent sockets 46 formed in the surface of an adjustable detent sleeve 47 threaded to the lower end of the rod 25.

A safety device is provided for protecting the engine battery against being drained by continued operation of the starter motor should the engine fail to start for any reason. This safety device includes a thermostatic element which is actuated by heat developed in the starter circuit as a result of prolonged operation of the starter motor. As illustrated, this comprises a bimetallic clip member 51 surrounding the rod 25 above the contact plate 24 and including a plurality of spaced clip arms 52 shaped to engage and yieldingly hold a clip-engaging ridge 53 on the bottom of an annular socket cylinder 54 adjustably threaded to the upper end 55 of the rod 25. A helical spring 56 surrounds the rod and is compressed between the upper end 57 of the cylinder socket and the bimetallic element 51.

The rod 25 is rotatable by means of a knurled knob 58 secured to the upper protecting end thereof for adjusting the relative position of the detent sleeve 47, while the socket cylinder 54 can be adjusted on the rod by rotation of the cylinder.

Fig. 5 illustrates a modified arrangement for moving the contact plate 24 downwardly into the second position upon operation of the engine to break the starter circuit while maintaining the ignition circuit closed. In this modification the operation is accomplished electromagnetically instead of by engine created vacuum. As illustrated, a solenoid coil 61 is supported between the insulating disks 18 and 26 and connected to a source of current which is actuated by operation of the associated engine, such as the conventional current generator 61a found on motor cors. In this case, the rod 25 constitutes and acts as the core of the solenoid to be drawn downwardly when the engine operates the generator to move the contact plate from the first or starting position to the second or operating position.

Fig. 6 illustrates a further modification in which engine temperature controls the rods 25 by an electromagnetic mechanism in place of the bellows 41. In the form shown, a solenoid coil 71 surrounds the lower end of a detent cylinder or sleeve 72 which acts as the core of the solenoid coil and is yieldingly pressed upwardly by a helical spring 73. The solenoid circuit 74 is connected to the battery 14a and is thermostatically controlled by a temperature responsive switch 75 including a bimetallic switch element 76 for rendering the solenoid active or inactive in accordance with temperature. Energizing the solenoid by closing the switch 75 in response to low engine temperature draws the sleeve 72 downwardly to break the detent connection with the rod 25 and free the plate 24 for movement by the spring 27 into starting position. Deenergizing the solenoid by opening of switch 75 in response to increase in engine temperature releases the sleeve 72 and permits spring 73 to raise the sleeve, reestablish the detent connection and move the rod 25 and contact plate 24 into neutral position.

A safety switch 78, or the like, see Fig. 1, is provided in the battery circuit for preventing operation of the device under improper conditions such, for example, as in the case of an automotive vehicle when the transmission is left in gear. The switch 78 can be actuated by a movable transmission member (not shown).

In operation, assuming engine temperature falls to a predetermined minimum at a time when the engine is idle, the sleeve 42 in the case of the bellows 41 is drawn downwardly by contraction of the bellows 41, or the sleeve 72 in the case of the electromagnet 71 is drawn downwardly by operation of the solenoid 71 by closing of the thermostat switch 75. Downward movement of the associated sleeve breaks the detent connection with the rod 25. At this time, the bimetallic clip arms 52 engage the ridge 53 and hold the socket cylinder 54 in the position illustrated in full lines in which the helical spring 56 is compressed between the cylinder and the bimetallic member 51 and thus rendered ineffective, transmitting little or no pressure to the contact plate 24. Hence, breaking of the detent connection between the thermostatically controlled sleeve, 41 or 71, and the rod 25 permits the spring 27 to snap the contact plate 24 upwardly into starting position as shown in Fig. 2, thereby closing both the starter motor circuit from the battery terminal 12 through the contact plate 24 and starter circuit terminal 15, and at the same time closing the ignition circuit from the battery terminal 12 through contact plate 24, coil spring 27, conducting plate 28 to ignition line 23. Resulting operation of the starter motor starts the engine, whereupon the rod 25 is drawn downwardly either through the operation of the vacuum cylinder and piston 34, 35 or the operation of the solenoid 61, or the like. As a result, the rod 25 moves the contact plate 24 into the second or operating position illustrated in Fig. 3, breaking the starter motor circuit while maintaining the ignition circuit closed through battery terminal 19, contact plate 24, ignition circuit terminal 22, etc.

In the modified embodiment shown in Fig. 5, the terminal 19a is connected to the generator 61a and the circuit of solenoid 61. Resulting operation of the associated engine is maintained until the temperature reaches a predetermined maximum at which point the bellows 41 for example, has expanded sufficiently to raise the sleeve 42 to a point where the detent balls 43 again engage in the recesses 46, whereupon further expansion of the bellows 41 and corresponding raising of the cylinder 42 lifts the rod 25 and moves the contact plate 24 into neutral position as shown in Fig. 1, thus breaking the ignition circuit, and discontinuing operation of the engine until the temperature again drops to the predetermined minimum whereupon the cycle is repeated. In the case of the solenoid 71 the thermostat switch 75 remains closed until the engine temperature reaches the selected maximum whereupon the switch opens, deenergizing the solenoid 71, permitting the spring 73 to raise the sleeve 72 to reestablish the detent connection with the rod 25 and raise the contact plate 24 into neutral position.

In the embodiment having the thermostatic bellows 41, it will be apparent that the exact temperature range, the limits of which effect operation of the device, can be varied by rotating the rod 25 to adjust the vertical position thereof relative to the threaded detent sleeve 47. Raising the sleeve 47 relative to the rod 25 raises the temperature range, requiring a greater expansion of the bellows 41 to reestablish the detent connection and position the contact plate 24 in neutral to discontinue operation of the engine. Such adjustment also results in causing contraction of the bellows 41 upon cooling to break the detent connection and institute operation of the starter motor at a relatively higher temperature. Obviously, reverse rotation of the rod 25 will lower the temperature range controlling operation of the device.

On the other hand, in the embodiment having the thermostatic switch element 76 controlling the solenoid coil 71, the temperature range can be varied by adjusting the relative position of the bimetallic switch element 76, for example by an adjusting screw 81, the adjustment of which will vary the temperature at which the switch 75 is operated.

The invention also includes a device for protecting the battery 14a against draining should the engine fail to start after a reasonable period of cranking by the starter. This device is caused to operate as a result of the increase in temperature of the contact plate 24 which, in the position shown in Fig. 2, forms a part of the starter circuit

[whereby temperature of the plate will be raised by continued operation of the starter. The bimetallic element 51 is so constructed that increase in temperature transmitted thereto from the contact plate 24 spreads the clip arms 52 and releases the holding ridge 53 on the socket cylinder 54, thus disconnecting the contact plate 24 from the cylinder 54 and freeing the helical spring 56 so that it can expand downwardly. The resulting downward pressure on the contact plate shifts it downwardly sufficiently against the pressure of the spring 27 to move the plate into neutral position and break the starter and ignition circuits. Under these conditions, the contact plate floats in neutral position between the helical spring 56 and the coil spring 27 and the device will be rendered inoperative until it is again manually set by pressing the knob 57 downwardly, in turn pressing the cylinder 54 downwardly against the clips 52 and reestablishing the connection of the clip arms with the cylinder holding ridge 53.]

*whereby temperature of the plate will be raised by continued operation of the starter. The bimetallic element 51 is so constructed that increase in temperature transmitted thereto from the contact plate 24 spreads the clip arms 52 and releases the holding ridge 53 on the socket cylinder 54, thus disconnecting the contact plate 24 from the cylinder 54 and freezing the helical spring 56 so that it can expand downwardly. The resulting downward pressure on the contact plate shifts it downwardly sufficiently against the pressure of the spring 27 to move the plate into neutral position and break the starter and ignition circuits. Under these conditions, the contact plate floats in neutral position between the helical spring 56 and the coil spring 27 and the device will be rendered inoperative until it is again manually set by pressing the knob 58 downwardly, in turn pressing the cylinder 54 downwardly against the clips 52 and reestablishing the connection of the clip arms with the cylinder holding ridge 53.*

*In the event that the engine should stall before reaching the desired upper limit of temperature, it would become necessary to reclose the starter circuit to restart the engine so that it could continue operating so that it could reach said upper limit of temperature. As shown in Fig. 3, which shows the position taken by the various elements during operation of the engine, the contact plate 24 lies across the second battery terminal 19 and the ignition circuit terminal 22 to complete the ignition circuit. The battery circuit is, of course, open at this time. Should the engine stall, the vacuum existing in the vacuum line 31 and the vacuum cylinder 34 would cease to exist and the piston 35 would rise and open the ignition circuit. Inasmuch as the detent connection is not established at this time, the coil spring 27 will urge contact plate 24 upwardly to lie across the battery terminal 12 and the starter terminal 15, which is the position shown in Fig. 2. It is to be noted that the ignition circuit is also closed in this position. The ignition circuit at this time is completed from the battery line 14 by the battery terminal 12 and the contact plate 24, through the coil spring 27 and the conducting plate 28 to the ignition line 23 by the ignition circuit terminal 22. The starter will then restart the engine which will re-establish the vacuum condition in the vacuum cylinder 34 to pull the contact plate 24 downwardly to the position shown in Fig. 3 for continued operation of the engine until the desired upper limit of engine temperature is reached.*

*In this manner, a stalled engine will be automatically restarted.*

The present invention can be provided as original equipment in a control system for an internal combustion engine, or it can be easily installed in existing systems. The construction is sturdy and includes no delicate parts which might be easily damaged or put out of adjustment. It is entirely automatic and will effectively prevent engine temperature from going below the selected minimum, while automatically terminating the operation of the engine when it has reached a sufficiently warm temperature.

The invention can, of course, be variously modified and adapted and portions thereof can be used without others.

I claim:

1. A control for internal combustion engines, including ignition and starter circuits and a source of potential, comprising circuit closing means movable into engine starting position to connect said source of potential to both said ignition and starter circuits, into engine operating position to connect said source of potential to said ignition circuit only, and into neutral position to disconnect all circuits, temperature controlled mechanism for causing said circuit closing means to move into said engine starting position or into said neutral position in response to predetermined variations in the temperature of said engine, and means actuated by operation of said engine for moving said circuit closing means into said operating position.

2. A control for internal combustion engines, including ignition and starter circuits and a source of potential, comprising a contact member movable into engine starting position to connect said source of potential to both said ignition and starter circuits, into engine operating position to connect said source of potential to said ignition circuit only, and into neutral position to disconnect all circuits, temperature controlled mechanism for causing said contact member to move into said engine starting position or into said neutral position in response to predetermined variations in the temperature of said engine, and means actuated by operation of said engine for moving said contact member into said operating position.

3. A control for internal combustion engines, including ignition and starter circuits and a source of potential, comprising a contact member movable into engine starting position to connect said source of potential to both said ignition and starter circuits, into engine operating position to connect said source of potential to said ignition circuit only and into neutral position to disconnect all circuits, temperature controlled mechanism for causing said contact member to move into said engine starting position or into said neutral position in response to predetermined variations in the temperature of said engine, means actuated by operation of said engine for moving said contact member into said operating position, and means responsive to prolonged operation of said starter circuit for causing said contact member to move into neutral position.

4. A control for internal combustion engines, including ignition and starter circuits and a source of potential, comprising a contact member movable into engine starting position to connect said source of potential to both said ignition and starter circuits, into engine operating position to connect said source of potential to said ignition circuit only, and into neutral position to disconnect all circuits, temperature controlled mechanism for causing said contact member to move into said engine starting position or into said neutral position in response to predetermined variations in the temperature of said engine, means actuated by operation of said engine for moving said contact member into said operating position, and means responsive to heat produced by prolonged operation of said starter circuit for causing said contact member to move into neutral position.

5. A control for internal combustion engines, including ignition and starter circuits and a source of potential, comprising a contact member movable into engine starting position to connect said source of potential to both said ignition and starter circuits, into engine operating position to connect said source of potential to said ignition circuit only, and into neutral position to disconnect all circuits, means for yieldingly urging said contact member into said engine starting position to start said engine, means for rendering said yielding means ineffective under a predetermined engine condition, a thermostat responsive to a predetermined low temperature to render said yielding means operative to move said member into said starting position, means actuated by operation of said engine for moving said member into said operating position, and means whereby said thermostat renders said yielding means ineffective and moves said contact member into neutral position in response to a predetermined high temperature to terminate operation of said engine.

6. A control for internal combustion engines, including ignition and starter circuits and a source of potential, comprising a contact member movable into engine starting position to connect said source of potential to both said ignition and starter circuits, into engine operating position to connect said source of potential to said ignition circuit only, and into neutral position to disconnect all circuits, means for yieldingly urging said contact member into said engine starting position to start said engine, means for rendering said yielding means ineffective under a predetermined engine condition, a thermostat responsive to a predetermined low temperature to render said yielding means operative to move said member into said starting position, means actuated by operation of said engine for moving said member into said operating position, means whereby said thermostat renders said yielding means ineffective and moves said contact member into neutral position in response to a predetermined high temperature to terminate operation of said engine, and means actuated by heat generated in said starter circuit by prolonged operation thereof for positioning said contact member in neutral.

7. A control for internal combustion engines, including ignition and starter circuits and a source of potential, comprising a contact member movable into engine starting position to close said ignition and starter circuits, into engine operating position to close said ignition circuit only, and into neutral position to disconnect all circuits, a thermostat, means controlled thereby for moving said member into starting position to start said engine on reaching a predetermined low temperature, means responsive to the engine operation to move said member into operating position to break said starter circuit and close said ignition circuit to maintain engine operation, and means responsive to operation of said thermostat upon a predetermined increase in engine temperature to move said member into said neutral position and terminate operation of said engine.

8. A control for internal combustion engines, including ignition and starter circuits and a source of potential, comprising a contact member movable into engine starting position to close said ignition and starter circuits, into engine operating position to close said ignition circuit only, and into neutral position to disconnect all circuits, a thermostat, yielding means controlled thereby for moving said member into starting position to start said engine on reaching a predetermined low temperature, means responsive to the engine operation to move said member into operating position to break said starter circuit and close said ignition circuit to maintain engine operation, and means responsive to operation of said thermostat upon a predetermined increase in engine temperature to move said member into said neutral position and terminate operation of said engine.

9. A control for internal combustion engines, including ignition and starter circuits and a source of potential, comprising a contact plate movable into engine starting position to close said ignition and starter circuits, into engine operating position to close said ignition circuit only, into neutral position to disconnect all circuits, means for controlling the position of said contact plate including a plate supporting rod, a temperature-responsive mechanism including a sleeve movable axially of said rod, means for connecting said sleeve and rod for simultaneous movement to position said plate in neutral position when the temperature of said engine reaches a predetermined temperature, and for disconnecting said rod from said sleeve when said sleeve is moved in response to a determinate decrease in engine temperature, and means for moving said contact plate into said starting position to start said engine when said rod is disconnected from said sleeve.

10. A control for internal combustion engines, including ignition and starter circuits and a source of potential, comprising a contact plate movable into engine starting position to close said ignition and starter circuits, into engine operating position to close said ignition circuit only, into neutral position to disconnect all circuits, means for controlling the position of said contact plate including a plate supporting rod, a temperature actuated member having a movable sleeve and responsive to temperature variations for moving said sleeve axially of said rod, means for connecting said sleeve and rod for simultaneous movement to position said plate in neutral position when the temperature of said engine reaches a predetermined temperature, and for disconnecting said rod from said sleeve when said sleeve is moved in response to a determinate decrease in engine temperature, and means for moving said contact plate into said starting position to start said engine when said rod is disconnected from said sleeve, said connecting means being adapted to reconnect said rod and sleeve on a predetermined increase in engine temperature to position said contact plate in neutral and terminate engine operation.

11. A control for internal combustion engines, including ignition and starter circuits and a source of potential, comprising a contact member movable into engine starting position to close said ignition and starter circuits, into engine operating position to close said ignition circuit only, and into neutral position in which all circuits are open, means for yieldingly holding said contact member in said engine starting position, and temperature controlled mechanism for holding said contact member in said neutral position to prevent operation of the engine over a selected temperature range including means adapted to release said contact member for movement by said yielding means to close said circuits at a predetermined low temperature.

12. A control for internal combustion engines, including ignition and starter circuits and a source of potential, comprising a contact member movable into engine starting position to close said ignition and starter circuits, into engine operating position to close said ignition circuit only, and into neutral position in which all circuits are open, means for yieldingly holding said contact member in said engine starting position, temperature controlled mechanism for holding said contact member in said neutral position to prevent operation of the engine over a selected temperature range including means adapted to release said contact member for movement by said yielding means to close said circuits at a predetermined low temperature, and means responsive to engine operation to cause said contact member to move into said operating position.

13. A control for internal combustion engines, including ignition and starter circuits and a source of potential, comprising a contact member movable into engine starting position to close said ignition and starter circuits, into engine operating position to close said ignition circuit only, and into neutral position in which all circuits are open, means for yieldingly holding said contact member in said engine starting position, temperature controlled mechanism for holding said contact member in said neutral position to prevent operation of the engine over a selected temperature range including means adapted to release said contact member for movement by said yielding means to close said circuits at a predetermined low temperature, means responsive to engine operation to cause said contact member to move into said operating position, and means actuated by overheating of said contact member in response to prolonged operation of said starter circuit to move said contact member into neutral position.

14. A control for internal combustion engines, including ignition and starter circuits and a source of potential, comprising a contact member movable into engine starting position to close said ignition and starter circuits, into engine operating position to close said ignition circuit only, and into neutral position in which all circuits are open, means for yieldingly holding said contact member in said engine starting position, temperature controlled mechanism for holding said contact member in said neutral position to prevent operation of the engine over a selected temperature range including means adapted to release said contact member for movement by said yieldingly means to close said circuits at a predetermined low temperature, means responsive to engine operation to cause said contact member to move into said operating position, means actuated by overheating produced by prolonged operation of said starter circuit for moving said contact member into neutral position including a spring adapted to engage said contact member to so move it, and means normally rendering said spring inoperative including a thermostatic spring holding device adapted to release said spring upon a predetermined rise in the temperature of said contact member.

15. A control for internal combustion engines having ignition and starter circuits and a source of potential, comprising a contact plate, a reciprocable plate supporting rod movable to selectively position said plate in engine starting position to connect said source of potential to said ignition and starter circuits, or in engine operating position to connect said source of potential to said ignition circuit only, or in neutral position to disconnect all circuits and terminate operation of said engine, means for yieldingly pressing said contact plate into engine starting position, means actuated by operation of the engine for moving said rod to shift said plate into engine operating position, a thermostatically controlled member movable in the direction of the rod axis, temperature-responsive means for moving said member in response to variations in engine temperature, and detent means adapted to connect said member to said rod to cause said rod to move said contact plate into neutral position and to disconnect said members from said rod when said temperature-responsive means is actuated by a predetermined low temperature to permit said yielding means to press said plate into engine starting position.

16. A control for internal combustion engines having ignition and starter circuits and a source of potential, comprising a contact plate, a reciprocable plate supporting rod movable to selectively position said plate in engine starting position to connect said source of potential to said ignition and starter circuits, or in engine operating position to connect said source of potential to said ignition circuit only, or in neutral position to disconnect all circuits and terminate operation of said engine, means for yieldingly pressing said contact plate into engine starting position, vacuum operated means actuated by operation of the engine for moving said rod to shift said plate into engine operating position, a thermostatically controlled member movable in the direction of the rod axis, temperature-responsive means for moving said member in response to variations in engine temperature, and detent means adapted to connect said member to said rod to cause said rod to move said contact plate into neutral position and to disconnect said member from said rod when said temperature-responsive means is actuated by a predetermined low temperature to permit said yielding means to press said plate into engine starting position.

17. A control for internal combustion engines having ignition and starter circuits and a source of potential, comprising a contact plate, a reciprocable plate supporting rod movable to selectively position said plate in engine starting position to connect said source of potential to said ignition and starter circuits, or in engine operating position to connect said source of potential to said ignition circuit only, or in neutral position to disconnect all circuits and terminate operation of said engine, means for yieldingly pressing said contact plate into engine starting position, electromagnetic means actuated by operation of the engine for moving said rod to shift said plate into engine operating position, a thermostatically controlled member movable in the direction of the rod axis, temperature-responsive means for moving said member in response to variations in engine temperature, and detent means adapted to connect said member to said rod to cause said rod to move said contact plate into neutral position and to disconnect said member from said rod when said temperature-responsive means is actuated by a predetermined low temperature to permit said yielding means to press said plate into engine starting position.

18. A control for internal combustion engines having ignition and starter circuits and a source of potential, comprising a contact plate, a reciprocable plate supporting rod movable to selectively position said plate in engine starting position to connect said source of potential to said ignition and starter circuits, or in engine operating position to connect said source of potential to said ignition circuit only, or in neutral position to disconnect all circuits and terminate operation of said engine, means for yieldingly pressing said contact plate into engine starting position, means actuated by operation of the engine for moving said rod to shift said plate into engine operating position, a thermostatically controlled member movable in the direction of the rod axis, temperature-responsive means for moving said member in response to variations in engine temperature, and detent means adapted to connect said member to said rod when said temperature-responsive means is actuated by a predetermined high temperature to cause said rod to move said contact plate into neutral position to terminate operation of the engine, and to disconnect said member from said rod when said temperature-responsive means is actuated by a predetermined low temperature to permit said yielding means to press said plate into engine starting position.

19. A control for internal combustion engines having ignition and starter circuits and a source of potential, comprising a contact plate, a reciprocable plate supporting rod movable to selectively position said plate in engine starting position to connect said source of potential to said ignition and starter circuits, or in engine operating position to connect said source of potential to said ignition circuit only, or in neutral position to disconnect all circuits and terminate operation of said engine, means for yieldingly pressing said contact plate into engine starting position, means actuated by operation of the engine for moving said rod to shift said plate into engine operating position, a thermostatically controlled member movable in the direction of the rod axis, temperature-responsive means for moving said member in response to variations in engine temperature, detent means adapted to connect said member to said rod when said temperature-responsive means is actuated by a predetermined high temperature to cause said rod to move said contact plate into neutral position to terminate operation of the engine, and to disconnect said member from said rod when said temperature-responsive means is actuated by a predetermined low temperature to permit said yielding means to press said plate into engine starting position, and means responsive to overheating of said contact plate for moving said plate into neutral position.

*20. A control for internal combustion engines, including ignition and starter circuits and a source of potential, comprising circuit closing means movable into engine starting position to connect said source of potential to both said ignition and starter circuits, and into neutral position to disconnect all circuits, temperature controlled mechanism for causing said circuit closing means to move into said engine starting position or into said neutral position in response*

*to predetermined lower and upper limits of the temperature of said engine, and means actuated by the partial vacuum created by operation of said engine for opening said starter circuit while maintaining the ignition circuit to keep the engine running.*

*21. A control for internal combustion engines, including ignition and starter circuits and a source of potential, comprising a contact member movable into engine starting position to connect said source of potential to both said ignition and starter circuits, and into neutral position to disconnect all circuits, temperature controlled mechanism for causing said contact member to move into said engine starting position or into said neutral position in response to predetermined variations in the temperature of said engine, and means actuated by operation of said engine to open said starter circuit but to enable the ignition circuit to remain closed through said contact member to keep the engine running.*

*22. A control for internal combustion engines, including ignition and starter circuits and a source of potential, comprising a contact member movable into engine starting position to connect said source of potential to both said ignition and starter circuits, and into neutral position to disconnect all circuits, temperature controlled mechanism for causing said contact member to move into said engine starting position or into said neutral position in response to predetermined variations in the temperature of said engine, means actuated by operation of said engine to open said starter circuit but to enable said ignition circuit to remain closed through said contact member to keep the engine running, and means responsive to prolonged closed-circuit condition of said starter circuit for causing said contact member to move into neutral position.*

*23. A control for internal combustion engines, including ignition and starter circuits and a source of potential, comprising a contact member movable into engine starting position to connect said source of potential to both said ignition and starter circuits, and into neutral position to disconnect all circuits, temperature controlled mechanism for causing said contact member to move into said engine starting position or into said neutral position in response to predetermined variations in the temperature of said engine, means actuated by operation of said engine to open said starter circuit, and means responsive to heat produced by prolonged closed-circuit condition of said starter circuit for causing said contact member to move into neutral position.*

*24. A control for internal combustion engines, including ignition and starter circuits and a source of potential, comprising a contact member movable into engine starting position to connect said source of potential to both said ignition and starter circuits, and into neutral position to disconnect all circuits, means for yieldingly urging said contact member into said engine starting position to start said engine, means for rendering said yielding means ineffective under a predetermined engine condition, a thermostat responsive to a predetermined low temperature of the engine to render said yielding means operative to move said member into said starting position, means actuated by operation of said engine to open said starter circuit, and means whereby said thermostat renders said yielding means ineffective and moves said contact member into neutral position in response to a predetermined high temperature to terminate operation of said engine.*

*25. The invention as defined in claim 20, wherein said mechanism for moving said circuit closing means includes resilient means to reclose the starter circuit in the event that the engine stalls before reaching said upper limit of temperature.*

CARL E. LINCOLN.

REFERENCES CITED

The following references are of record in the file of this patent or the original patent:

UNITED STATES PATENTS

| Number | Name | Date |
|---|---|---|
| 1,081,683 | Lurie | Dec. 16, 1913 |
| 1,269,637 | Olmsted | June 18, 1918 |
| 1,287,266 | Eberly | Dec. 10, 1918 |
| 1,344,464 | Varley | June 22, 1920 |
| 1,386,844 | Cowen | Aug. 9, 1921 |
| 1,409,736 | Lea | Mar. 14, 1922 |
| 1,507,300 | Replogle | Sept. 2, 1924 |
| 1,544,350 | Sisson | June 30, 1925 |
| 1,654,220 | Johnstone et al. | Dec. 27, 1927 |
| 1,719,049 | Forsberg | July 2, 1929 |
| 1,776,683 | Larkin | Sept. 23, 1930 |
| 1,932,064 | Conant et al. | Oct. 24, 1933 |
| 1,981,859 | Frese | Nov. 27, 1934 |
| 1,992,568 | Connor | Feb. 26, 1935 |
| 2,051,240 | Berryman | Aug. 18, 1936 |
| 2,400,216 | Smith | May 14, 1946 |

Certificate of Correction

Reissue No. 23,340

February 13, 1951

CARL E. LINCOLN

It is hereby certified that error appears in the printed specification of the above numbered patent requiring correction as follows:

Column 2, line 38, for the word "on" read in ; column 4, line 20, for "cors" read cars ; line 27, for "rods" read rod ; column 6, line 29, for "*freezing*" read *freeing*; column 9, line 49, for "circuit" read circuits ; and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*